3,684,523
HEAT STERILIZED, STABLE AQUEOUS
DAIRY DRINK
Emanuel J. McGinley, 9 Colesbery Drive, Penn Acres,
New Castle, Del. 19720, and Joseph M. Zuban, 2595
Wickersham Lane, Chester, Pa. 19014
No Drawing. Filed Feb. 4, 1970, Ser. No. 8,735
Int. Cl. A23c 9/10; A23g 1/00
U.S. Cl. 99—63                     10 Claims

ABSTRACT OF THE DISCLOSURE

A heat sterilized, stable artificial aqueous dairy drink containing cocoa, an edible fat, fatty oil or mixtures of these, and a stabilizing amount of finely-divided, water-insoluble $\beta$-1,4 glucan, as well as the method of preparing the artificial drink are disclosed herein.

---

Artificial dairy drinks including, for example, chocolate drinks, filled and imitation milk, require a heat sterilization treatment to give them prolonged shelf life. Stabilizers and thickeners useful for dairy drinks which have not been heated, in most instances, do not perform their intended function after heat sterilization of the drinks. After heat sterilization with ineffective stabilizers, larger particulate solids as found in cocoa will mostly settle out and, even after severe agitation will continue to settle. Fats or fatty oils including cocoa oil, butter fat and vegetable fats and oils used in these drinks will form an unattractive layer at the top of the drink after sterilization.

It is an object of this invention to provide a heat sterilized, stable aqueous artificial dairy drink.

It is another object to provide a method of preparing said drink.

These and other objects are accomplished in accordance with this invention which is a heat sterilized, stable artificial dairy drink consisting essentially of at least 75% by weight of water, an edible substance selected from the group consisting of cocoa, fats, fatty oils and mixtures thereof, and finely-divided, water-insoluble organic particles, at least 90 percent by weight consisting of $\beta$-1,4 glucan, at least about 30% by weight of said particles having a size of no greater than about 1 micron, said organic particles being present in an amount sufficient to stabilize said dairy drink after heat sterilization.

The method of this invention comprises mixing an edible substance selected from the group consisting of cocoa, fats, fatty oils and mixtures thereof with an aqueous dispersion of finely-divided organic particles, at least 90 percent by weight consisting of $\beta$-1,4 glucan, at least about 30 percent by weight of said particles having a size of no greater than about 1 micron, said organic particles being present in an amount to stabilize the aqueous mixed substance after heat sterilization and said aqueous dispersion containing at least 75 percent by weight of water after addition of said substance and then heat sterilizing the aqueous mixture.

The cocoa includes fat containing or non-fat cocoa usually available as a dried powder. This material can be present in the drink in an amount ranging from about 0.25 up to about 5 percent or higher. Preferably the particulate material ranges from about 0.25 to about 1.0 percent.

The edible fats and fatty oils include, for example, cocoa oil, soy bean oil, coconut oil, cottonseed oil and other vegetable oils, milk fats, and vegetable fats of the unsaturated and hydrogenated type. These fatty substances can be present in the dairy drink in amounts up to 10% or higher and preferably from about 2 to 4% by weight.

Other substances are generally present in the artificial dairy drink including, for example, non-fat milk solids, corn syrup solids, salts, sugars or artificial sweeteners, starches, emulsifiers, flavoring agents, vitamins and the like. Most of these substances either form true solutions or colloidal solutions with little or no need for stabilizers. If substances are used which require additional stabilizers, these may be incorporated as long as they do not detrimentally affect the action of the stabilizer of this invention.

The compositions and methods of this invention are improvements over the disclosure in U.S. Pat. No. 3,023,104 to O. A. Battista, issued Feb. 27, 1962.

The water-insoluble, organic material of which a proportion is $\beta$-1,4 glucan, is originally derived from cellulose-containing plant life, in most instances, wood, cotton, and bast or leaf fibers. In general, materials obtained from a holo-cellulose source are most useful, for example, ramie, flax, hemp, cotton, processed cellulose-containing material, for example, cotton linters, purified cotton, wood pulps such as bleached sulfite and sulfate pulps, regenerated forms of cellulose including rayon and cellophane, and the like. If the source material is too low in $\beta$-1,4 glucan content, it is purified to remove nonessential or undesirable components such as pentosans, galactomannans, glucomannans, and the like, to provide a product containing at least 90 and preferably about 99% of $\beta$-1,4 glucan.

This material is then finely divided to provide particles at least about 30% by weight of which are less than 1 micron, Stokes equivalent diameter and a substantial proportion of the remaining particles being no greater than 50 microns, preferably no greater than about 11 microns. In general, these particles will have a length to diameter ratio greater than 1, preferably at least 2:1 up to about 15:1 as determined, for example, by examination with an electron microscope.

The term "substantial" as used above is meant to include a mass of particles at least about 90% of the total of which are within the prescribed particle range.

The method of achieving the low particle size is not critical from the standpoint of this invention and will generally include, for example, mechanical disintegration, a combination of chemical degradation and mechanical attrition, chemical treatment only, precipitation from solution, and chemical regeneration. It is preferred on the basis of practical utility, that a combination of chemical degradation and mechanical attrition be used in forming the specified particle size of the water-insoluble $\beta$-1,4 glucan-containing material.

Hereinafter, the term "cellulose" will be used to represent $\beta$-1,4 glucan-containing materials for ease of explanation and illustration.

Chemical degradation of the cellulose material is brought about in a known manner to facilitate disintegration, for example the material may be subjected to acid or alkali hydrolysis, or enzymatic treatment. One specific method of obtaining the desired result is reported in U.S. 2,978,446 issued Apr. 4, 1961, to O. A. Battista et al., wherein cellulose is subjected to a 2.5 normal aqueous solution of hydrochloric acid at boiling (about 105° C.) for 15 minutes. This more drastic hydrolysis treatment provides a material which may be readily mechanically attrited in an aqueous medium with a nominal amount of energy. Similar treatments with mineral acids or alkali under more or less drastic conditions will produce attritable degraded cellulose using nominal or increased energy for disintegration of the material to the proper particle size.

The type of starting material prior to chemical degradation will also determine the amount of input energy for attrition of the cellulose to obtain the desired particle size. For example, dilute hydrochloric acid hydrolysis of regenerated forms of cellulose will produce a material substantially all of which can be attrited to the desired particle size by merely dispersing the same with a conventional electrically driven kitchen beater in an aqueous medium for a few minutes. Other forms of cellulose, for example, wood pulp and cotton linters, after a similar hydrolysis treatment must be attrited with the same or more efficient equipment for at least one quarter hour or more in an aqueous medium to provide a material at least a portion of which is within the desired particle size range. Mechanical attrition may be carried out by known techniques using, for example, kitchen mixers, blenders, planetary mixers, ball mills, attrition mills, sonic mixers, high speed shearing devices, and the like. In addition, the material may be forced through a multiplicity of fine holes whereby it is subjected to a shearing action first by passage through said holes and thereafter by rubbing together of the various particles under the influence of applied force. The disintegration is preferably carried out in the presence of an aqueous medium to appreciably reduce the energy necessary to produce smaller particle sizes. The attrition should be extended to produce a mass wherein at least 30% of the particless are les than 1 micron; preferably 100% of the particles measure no greater than about 1 micron. Particles having a size, for example, as small as 0.01 micron are useful for this invention.

As previously stated, regenerated forms of cellulose, for example, regenerated cellulose film, are easily brought to the precribed particle size after the controlled acid hydrolysis by merely dispersing the wet-cake material in water with a mixer. This will produce a stable dispersion wherein the dispersed particles are substantially all less than 0.4 micron in size.

When wood pulp, cotton linters, and similar cellulose materials are hydrolyzed under controlled conditions, mechanically attrited in an aqueous medium and dried, they are difficult to redisperse in water. It has been found that this type of cellulose may be advantageously combined with a minor proportion of a specific barrier material to provide a readily redispersible mass.

Briefly, the barrier material is a specified sodium salt of carboxymethyl cellulose having a degree of substitution of from about 0.60 to about 0.90, and preferably having a viscosity in centipoises at 25° C. in a 2% aqueous solution of less than 18 up to about 800. The barrier may be combined with the finely-divided cellulose by mixing together and drying a suspension of the cellulose particles and a minor proportion of the barrier material. The combination of barrier and cellulose particles is commercially advantageous for the purpose of this invention.

The amount of sodium CMC which is intimately combined with the cellulose particles ranges from about 5 to 15 percent based on the total weight of the combination.

As an example of the preparation of the cellulose-CMC product, dissolving wood pulp (95% alpha cellulose) was subjected to an acid hydrolysis in accordance with Pat. No. 2,978,446. Residue of the hydrolysis process was thoroughly washed and the resulting wet filter cake contained 40 ± 2% solids. The wet filter cake was continuously introduced into a high speed paddle mixer at a rate of about 110 pounds per hour based on the dry weight of the cellulose. Simultaneously, air dried CMC was introduced into the mixer in an amount equivalent to 8% based on the dry weight of the cellulose. The mixer consisted essentially of a horizontally mounted cylinder with a rotor having spaced paddles each set at an angle so as to attrite the solids by impact and high shear and move the mass through the cylinder. The specific mixer was a comercially available mixer marketed under the trade name "Turbilizer."

The mass as discharged contained approximately 40.5% cellulose, 3.5% CMC and 56% water and was introduced into a second mixer comercially marketed under the trade name "Rietz Extructor." The mass was moved through a horozintal chamber divided into compartments by perforated plates by means of a screw thread conveyor in the several compartments. As the mass was moved through the chamber, water was added so as to reduce the solids content of the mass to about 30%. In this apparatus, the mass becomes compressed in the several chambers as it is advanced to each perforated plate, is smeared on the perforated plates and is forced through the apertures in the plates all of which result in subjecting the cellulose particles to a high shear and cause a further attrition of the particles. These actions also effect a continuous mixing of the several ingredients. The mass as it issued from the mixer contained 30 to 32% solids.

The mass was fed to the nip of two spaced rotating drying drums heated with steam at about 90 lbs. pressure. The spacing of the drums provided coatings on the drums of a thickness of about 0.01 inch. The dried coating, having a moisture content of 5 ± 2%, was removed by doctor blades and conveyed to a crushed or grinder where the material was pulverized to pass through a 60 mesh screen.

A product with like characteristics was also prepared by spray drying. In this type of processing, the mass as it was discharged from the second mixture was transferred to a slurry tank where water was added to reduce the solids content to 5–6%. After thorough mixing, the slurry was passed through an inline high speed mixer and then to a spray dryer. The slurry was dried using air introduced into the drying chamber at a temperature of about 575° F.

In the dry state, this combination of cellulose particles and CMC can be characterized as a water-insoluble, water-dispersible powder comprising, by weight, from about 85 to about 95 parts of a finely-divided material of at least 90% β-1,4 glucan and from about 15 to about 5 parts of sodium carboxymethyl cellulose having a degree of substitution of 0.75±0.15 intimately associated with said finely-divided material, the powder being characterized as capable of forming a stable dispersion in water wherein at least 30% of the dispersed particles have a particle size not exceeding 1 micron.

While smaller particles of cellulose, such as prepared from regenerated cellulose, are more efficient colloidal stabilizers, from a commercial standpoint it is more practical to use cellulose particles which have been prepared from wood pulp, cotton linters or the like which after chemical hydrolysis and mechanical attrition provide particles at least about 30% by weight and preferably 100% having a size less than about 1 micron, a substantial proportion of any remaining particles being not greater than about 11 microns. Furthermore, the preferred cellulose particles of this invention are combined with the sodium salt of carboxymethyl cellulose as previously described to provide a stabilizer material which is more readily redispersed in water by dairy drink producers.

In addition to the above cellulose-CMC combination, the cellulose-CMC combination can at times be advantageously mixed with milk solids and the mixture dried together. For example, the desired amount of non-fat milk solids and cellulose-CMC are mixed together by first dispersing the cellulose-CMC material in water with a Waring Blendor. The milk solids dispersed in additional water are mixed into the cellulose-CMC dispersion. A substantial portion of the water is evaporated off with heat and the remainder is allowed to dry in air. This dried material is then ready to be used in the preparation of dairy drinks by the manufacturer. The amount of milk solids which can be mixed and dried with the cellulose-CMC combination ranges from about one up to about 30 times the weight of the cellulose-CMC combination.

The particulate cellulose or water-insoluble organic particles consisting of β-1,4 glucan are present in the dairy drink in an amount sufficient to stabilize said drink after heat sterilization. The term "after heat sterilization" is used since the small amounts of particulate cellulose which will stabilize the cocoa particles and/or fats in the drink after heat sterilization will not stabilize the drink prior to heat sterilization. In general, amounts ranging from 0.1 up to about 1% by weight will stabilize the cocoa particles and fats in a heat sterilized dairy drink. Amounts used are preferably based on the amounts of solids or fats in the drink. For example, amounts of the finely-divided cellulose stabilizer ranging from about 10 to 200% based on the weight of the cocoa solids and/or fats to be stabilized are generally used, with from about 25 to 120% being preferred.

When preparing the aqueous dairy drink it is important that the finely-divided cellulose stabilizer is first thoroughly dispersed in water before addition of other ingredients. This can be accomplished by utilizing "never-dried" finely-divided cellulose, from the mechanical attrition step of its preparation or in the form of an attrited wet-cake, and adding the desired amount of water with agitation. With the preferred particles of the cellulose-CMC combination, the dry powder is added to water with high speed agitation. The remaining ingredients are then added and dispersed.

Heat sterilization is brought about for example, by heating the drink above the boiling point for about 10 minutes to about an hour. Lower temperatures for longer periods of time may also be used as in known heat sterilization techniques.

The following examples are set forth to demonstrate this invention.

EXAMPLE I

A chocolate drink was prepared by mixing the following ingredients together:

| Ingredients: | Percent by weight |
|---|---|
| Water | 87.675 |
| Non-fat milk solids | 5.650 |
| Sucrose | 6.000 |
| Cocoa | 0.675 |
| Total | 100.000 |

This preparation was sterilized by heating to 240° F. for 20 minutes. When the drink cooled, the larger cocoa particles formed a compacted layer at the bottom of the container.

In chocolate drinks prepared with fat containing cocoa, other vegetable fats or milk fats, a heavy oleaginous layer forms at the top of the container after heat sterilization.

EXAMPLE II

The above example was repeated except that a small proportion of water was replaced with 0.03% by weight of carrageenan, a conventional dairy drink stabilizer and thickener. The results were the same as in Example I after heat sterilization. The amount of carrageenan used was as high as recommended by the supplier for liquid drinks. Higher amounts would cause the liquid to gel.

A commercially available heat sterilized chocolate drink which contained carrageenan as shown on the bottle cap was observed. It had a heavy compacted dark layer at the bottom of the bottle which was redispersed only after severe shaking. The solids settled very quickly when the bottle was allowed to stand.

EXAMPLE III

A finely-divided cellulose product was prepared by the acid hydrolysis and attrition of Tyrecell wood pulp as described heretofore. This product remained wet from processing (never-dried) and had particles which were substantially all under 1 micron and 66% of these were under 0.2 micron in size.

The wet cellulose particles were thoroughly dispersed in water to obtain a concentration of 0.3% by weight. Non-fat milk solids, sucrose and dry cocoa powder were thoroughly mixed into the dispersion to provide a mixture having the following percentage of ingredients:

| Ingredients: | Percent by weight |
|---|---|
| Water | 87.375 |
| Milk solids (N.F.) | 5.650 |
| Sucrose | 6.000 |
| Cocoa | 0.675 |
| Cellulose stabilizer | 0.300 |
| Total | 100.000 |

This mixture was sterilized at 240° F. for 20 minutes and then cooled to room temperature and allowed to stand. There was no noticeable settling or precipitation of the chocolate drink after standing for over two weeks.

EXAMPLE IV

A finely-divided cellulose product prepared by the acid hydrolysis and attrition of wood pulp as described heretofore and having 30% of its particles less than 0.2 micron and substantially all of its particles less than 11 microns was combined with 8% of the sodium salt of carboxymethyl cellulose having a degree of substitution of about 0.75. The finely-divided cellulose and sodium salt of CMC as a barrier were combined as described heretofore.

This product which shall be referred to as the cellulose stabilizer was added to water and agitated to produce a homogeneous slurry. Non-fat milk solids were added and blended with the slurry and sugar was also dissolved into the mixture. Dry cocoa powder containing some fatty residue was then thoroughly mixed in and sufficient water added to provide the following percentage mixture:

| Ingredients: | Percent by weight |
|---|---|
| Water | 85.60 |
| Milk solids | 5.80 |
| Sugar | 7.50 |
| Cocoa | 0.50 |
| Cellulose stabilizer | 0.60 |
| Total | 100.00 |

This level of cellulose stabilizer of the specified particle size was not sufficient to maintain the cocoa in a suspended state prior to heating.

The above chocolate drink was sterilized in an autoclave at 240° F. for 20 minutes.

After three weeks storage at room temperature, samples of the heat sterilized chocolate drink were checked for instability in the form of solid matter floating on the surface of the drink and settling of cocoa particles. The heat sterilized chocolate drink of this example showed no surface scum and only a trace of settling of cocoa particles compared to a control in which no stabilizer was employed which showed a heavy accumulation of surface scum and heavy settling of cocoa particles.

When similar heat sterilized chocolate drinks were prepared with lower amounts of cellulose stabilizer, some surface accumulation and cocoa particle settling was noted after three days standing at room temperature.

EXAMPLE V

The procedure of Example IV was repeated except that the particle size of the finely-divided cellulose product was 66% under 0.2 micron and substantially all under 1 micron. The results found for the heat sterilized chocolate drink with varying amounts of cellulose stabilizer incorporated therein after three days storage at room temperature are set forth in the following table:

TABLE

| Stabilizer level, percent | Surface separation (fat) | Cocoa sedimentation |
| --- | --- | --- |
| 0.00 ((control)) | Heavy accumulation | Heavy—compacted. |
| 0.10 | Slight accumulation | Slight. |
| 0.20 | Trace | None. |
| 0.30 | None | Do. |
| 0.40 | do | Do. |

It is evident that the smaller particle size of the cellulose stabilizer makes it more efficient and permits excellent stabilization of the heat sterilized drink at lower stabilizer amounts.

EXAMPLE VI

A filled milk product was prepared by thoroughly dispersing non-fat milk solids, and vegetable fat into water in which the cellulose stabilizer of Example V had previously been dispersed. A control filled milk was also prepared wherein no cellulose stabilizer was employed. These products had the following percentage of ingredients:

| | Percent by weight | |
| --- | --- | --- |
| Ingredients | Control | Stabilized |
| Water | 87.25 | 87.20 |
| Non-fat milk solids | 9.00 | 9.00 |
| Vegetable fat | 3.50 | 3.50 |
| Standard emulsifier | 0.25 | |
| Cellulose stabilizer | | 0.30 |
| Total | 100.00 | 100.00 |

These products were sterilized by heating to 240° F. for 20 minutes, cooled to room temperature, and allowed to stand. After two weeks the control sample had a noticeable layer of globules at the top while the cellulose particle containing filled milk appeared homogeneous.

EXAMPLE VII

An imitation milk product was prepared by thoroughly dispersing vegetable protein, corn syrup solids, and vegetable fat into water in which the cellulose stabilizer of Example V had previously been dispersed. A control imitation milk was also prepared wherein no cellulose sterilizer was employed. These products had the following percentage of ingredients:

| | Percent by weight | |
| --- | --- | --- |
| Ingredients | Control | Stabilized |
| Water | 87.00 | 86.70 |
| Vegetable protein | 1.00 | 1.00 |
| Corn syrup solids | 8.00 | 8.00 |
| Vegetable fat | 4.00 | 4.00 |
| Cellulose stabilizer | | 0.30 |
| Total | 100.00 | 100.00 |

The imitation milk preparations were sterilized by heating to 240° F. for 20 minutes, cooled to room temperature, and allowed to stand. After two weeks, the control sample had a noticeable layer of globules at the top while the cellulose particle containing imitation milk appeared homogeneous.

EXAMPLE VIII

A chocolate drink was prepared by first mixing 500 cc. of water and 6 gms. of the cellulose stabilizer of Example V in a Waring Blendor and then adding a mixture of 120 gms. of non-fat milk solids and 1374 cc. of water with continued mixing. Water was evaporated off by heating to boiling until about one-half the volume remained. The mass was then air-dried.

The air-dried material was then added to water along with cocoa and sucrose and the mixture was passed through a homogenizer at 1000 p.s.i.

The percentage of ingredients in the blend was as follows:

| Ingredients: | Percent by weight |
| --- | --- |
| Water | 85.70 |
| Sucrose | 7.50 |
| Cocoa | 0.50 |
| Non-fat milk solids | 6.00 |
| Cellulose stabilizer | 0.30 |
| Total | 100.00 |

This chocolate drink was sterilized by heating to 250° F. for 20 minutes, cooled to room temperature and allowed to stand. The cocoa in the drink appeared to remain in suspension with no formation of a dark layer at the bottom.

The foregoing example demonstrates a modification in the method of preparing drinks containing the cellulose stabilizer and milk solids.

Various changes and modification may be made practicing this invention without departing from the spirit and scope thereof and therefore the invention is not to be limited except as defined in the appended claims.

We claim:

1. A heat sterilized, stable artificial dairy drink comprising at least 75% by weight of water, an edible substance selected from the group consisting of cocoa, fats, fatty oils and mixtures thereof, and finely-divided, water-insoluble organic particles, at least 90% by weight consisting of $\beta$-1,4 glucan, at least about 30% by weight of said particles having a size of no greater than about 1 micron, said organic particles being present in an amount which will not stabilize said dairy drink prior to heat sterilization but which is sufficient to stabilize said dairy drink after heat sterilization without the formation of a gel.

2. The heat sterilized dairy drink of claim 1 wherein at least 30% by weight of said organic particles are under 0.2 micron and substantially all of said particles are under 11 microns, said organic particles being intimately associated with from about 15 to about 5% based on the weight of the mixture, of sodium carboxymethyl cellulose having a degree of substitution of 0.75±0.15, and said organic particles are present in an amount ranging from about 25 up to about 120% based on the weight of said edible substance.

3. The heat sterilized dairy drink of claim 1 which also includes non-fat milk solids.

4. The heat sterilized dairy drink of claim 1 wherein said edible substance is cocoa.

5. The heat sterilized dairy drink of claim 1 wherein said edible substance is cocoa and said dairy drink also includes a sweetener and milk solids.

6. The heat sterilized dairy drink of claim 1 wherein said edible substance is vegetable oil and said dairy drink also includes milk solids.

7. The heat sterilized dairy drink of claim 1 wherein said edible substance is vegetable fat and said dairy drink also includes vegetable protein.

8. The method of preparing a heat sterilized stable, artificial dairy drink which comprises mixing on edible substance selected from the group consisting of cocoa, fats, fatty oils and mixtures thereof with an aqueous dispersion of finely-divided organic particles, at least 90% by weight consisting of $\beta$-1,4 glucan, at least about 30% by weight of said particles having a size of no greater than about 1 micron, said organic particles being present in an amount which will not stabilize said mixed edible substance in said aqueous dispersion prior to heat sterilization but which is sufficient to stabilize the mixed edible substance in said aqueous dispersion after heat sterilization without the formation of a gel and said aqueous dispersion containing at least 75% by weight of water after addition of said substance, and then heat sterilizing the aqueous mixture.

9. The method of claim 8 wherein the aqueous dispersion of finely-divided organic particles is prepared by vigorously mixing with water a water-insoluble, water-dispersible powder comprising, by weight, from about 85 to about 95 parts of the finely-divided β-1,4 glucan particles at least about 30% by weight having a size no greater than about 0.2 micron and substantially all being less than 11 microns, and from about 15 to about 5 parts of sodium carboxymethyl cellulose having a degree of substitution of 0.75±0.15 intimately associated with the finely-divided β-1,4 glucan particles.

10. The method of claim 9 wherein said water-insoluble, water-dispersible powder also comprises from 1 to 30 times its weight in milk solids intimately mixed therewith.

References Cited

UNITED STATES PATENTS

| | | | |
|---|---|---|---|
| 3,486,905 | 12/1969 | Hotelling | 99—25 |
| 3,023,104 | 2/1962 | Battista | 99—1 |
| 3,140,953 | 7/1964 | Roberts | 99—23 X |
| 3,067,037 | 12/1962 | Herald et al. | 99—1 X |
| 3,297,806 | 1/1967 | Battista et al. | 99—150 X |

FOREIGN PATENTS

| | | | |
|---|---|---|---|
| 961,398 | 6/1964 | Great Britain | 99—1 |

S. LEON BASHORE, Primary Examiner

F. FREI, Assistant Examiner

U.S. Cl. X.R.

99—25, 212

UNITED STATES PATENT OFFICE
CERTIFICATE OF CORRECTION

Patent No. 3,684,523     Dated 15 August 1972

Inventor(s) Emanuel J. McGinley and Joseph M. Zuban

It is certified that error appears in the above-identified patent and that said Letters Patent are hereby corrected as shown below:

Col. 1, line 6, add "assigners to FMC Corporation, Philadelphia, Penna." Col. 3, line 25, "les" should read --less--. Col. 4, line 4, "horozintal" should read --horizontal--; line 22, "crushed" should read --crusher--. Col. 8, line 63, "on" should read --an--.

Signed and sealed this 3rd day of April 1973.

(SEAL)
Attest:

EDWARD M. FLETCHER, JR.      ROBERT GOTTSCHALK
Attesting Officer      Commissioner of Patents